United States Patent [19]

Müller et al.

[11] Patent Number: 4,767,577

[45] Date of Patent: Aug. 30, 1988

[54] PROCESS AND APPARATUS FOR PRODUCING PLASTIC-BOUND PROPELLANT POWDERS AND EXPLOSIVES

[76] Inventors: Dietmar Müller, Heinrich-Bilienfeinweg 2, D-7500, Karlsruhe 41, Fed. Rep. of Germany; John E. Stewart, 182 Mckinley Pl., Ridgewood, N.J. 07450

[21] Appl. No.: 914,072

[22] Filed: Oct. 1, 1986

[30] Foreign Application Priority Data

Oct. 3, 1985 [DE] Fed. Rep. of Germany ....... 3535281

[51] Int. Cl.[4] ...................... C06B 21/00; C06B 45/00; B29D 7/16

[52] U.S. Cl. ....................................... 264/3.3; 83/365; 149/2; 149/19.92; 149/92; 149/96; 149/100; 149/109.6; 264/3.2; 264/148; 264/159; 425/131.1; 425/113; 425/174; 425/174.4; 425/DIG. 16; 425/DIG. 243

[58] Field of Search ................... 264/3.5, 3.6, 3.1, 3.2, 264/3.3, 148, 157, 159, 163; 425/78, 79, 131.1, 113, 120, 128, 174, 174.4, 543, DIG. 16, DIG. 110, DIG. 243; 149/96.2, 97, 109.6, 92, 100, 98, 19.92; 83/289, 365, 369, 367

[56] References Cited

U.S. PATENT DOCUMENTS 3,874,207 4/1975 Lemelson ............................... 72/56
3,969,167 7/1976 Johannes ............................... 149/98
4,051,207 9/1977 Brachert et al. ..................... 264/3.3
4,102,953 7/1978 Johnson et al. ...................... 264/3.3
4,525,313 6/1985 Muller ................................. 264/3.2
4,585,600 4/1986 Rollyson et al. ..................... 264/3.3
4,608,210 8/1986 Muller et al. ........................ 264/3.2

FOREIGN PATENT DOCUMENTS 3412410 10/1985 Fed. Rep. of Germany .

*Primary Examiner*—Stephen J. Lechert, Jr.
*Assistant Examiner*—Howard J. Locker
*Attorney, Agent, or Firm*—Antonelli, Terry & Wands

[57] ABSTRACT

A process and apparatus for producing plastic-bound propellant powders and explosives in crystalline form, with the apparatus including an extruder comprising a casing with a feed opening, optionally a solvent supply opening and one or two extruder shafts with kneading and conveying segments. For processing the plastic binders, which polymerize photochemically or under X-rays, a casing section transparent for the rays is provided, with polymerization within the extruder being initiated by UV/VIS or X-radiation sources arranged around it and the radiation intensity and/or the wavelength of the radiation are controlled as a function of the pressure difference over a given path in a compression zone of the extruder, in such a manner that the propellant or explosive strand or strands leave the extruder in a dimensionally stable and cuttable manner.

10 Claims, 3 Drawing Sheets

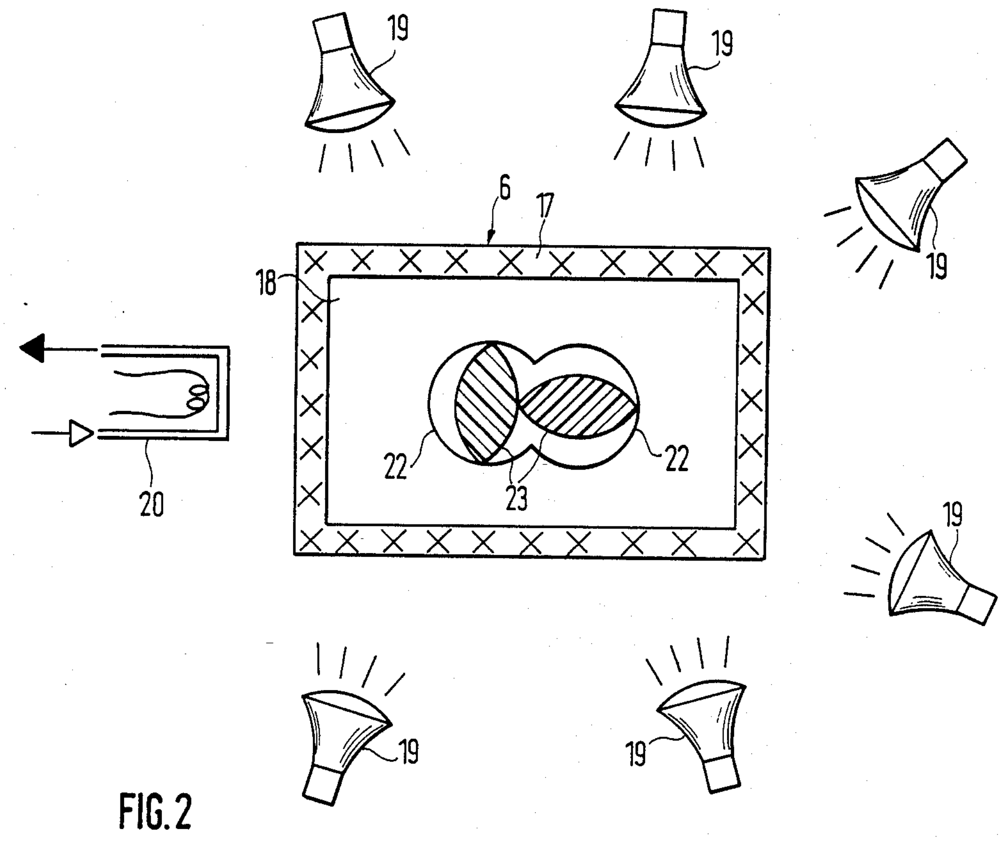
FIG. 2
FIG. 3
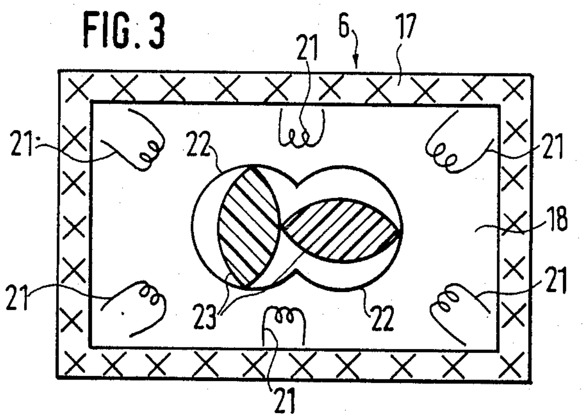

PROCESS AND APPARATUS FOR PRODUCING PLASTIC-BOUND PROPELLANT POWDERS AND EXPLOSIVES

BACKGROUND OF THE INVENTION

The invention relates to a process and apparatus for producing plastic-bound propellant powders and explosives by an extruder, comprising a casing with at least one draw or feed opening, optionally a solvent supply opening and at least one extruder screw shaft with kneading and conveying segments, the casing having at least one section transparent to UV/VIS or X-rays and a plastic binder polymerizable under these rays is supplied via the feed opening until the segments of the extruder shaft "float" without wall friction in the plastic binder and subsequently the components of the propellant powder or explosive material are added in crystalline form.

In, for example, German Pat. No. 30 44 577, DE-OS No. 32 42 301, and U.S. Pat. Nos. 4,525,813 and 4,608,210, it is proposed to build up monobasic, dibasic and also tribasic propellant powders, which all have a nitrocellulose base, into strand form by extrusion and then, by cutting, propelling compositions or propellant powders are produced therefore. In addition, propellant powders and explosives are known, which are bound in a plastic matrix. This involves the use of crystalline explosive materials, mainly hexogen, octogen or mixtures thereof (HMX-RDX) and/or nitroguanidine. It is also possible to add additives, such as nitrocellulose which improve the ignition behaviour in small amounts, together with other high-energy polymers. Previously, plastic-bound propellant powders and explosives could only be produced in batches, with the binder proportion being relatively high at approximately 15% and more.

By the process referred to hereinabove, and, more particularly, in U.S. Pat. No. 4,608,210 it is also possible to produce the aforementioned propellant powders or explosives with crystal grain in a plastic matrix by extrusion. Initially the plastic binder is added to the extruder in solid, dissolved or suspended form via the feed opening until the screw shafts "float" without reciprocal friction and wall friction in the plastic binder and this is followed by the addition of the components of the propellant powder or explosive material in crystalline form with a constantly increasing proportion, accompanied by a simultaneous decrease on the plastic binder proportion and finally the mixing ratio is kept constant. If addition takes place in dissolved or suspended form, precautions are taken for drawing off the solvent or suspension fluid, while on adding solid plastic binders within the extruder, a melting process is performed at temperatures up to max 130° C. This makes it possible to produce propellant powders in strand form with channels or also explosives in strand form. During such processing of high-energy materials, particular care must be taken to avoid any metallic friction and that the process is performed in a completely satisfactory manner with regards temperature, pressure and polymerization rate. The first-mentioned risk is countered in that the extruder segments are initially "fed" with the plastic binder, so that friction between the segments and wall friction are excluded, in that the screw or screws are centered within the extruder. However, the other process control parameters cause certain problems if the polymerization processes exclusively take place at elevated temperature and/or in the multicomponent system and/or in the presence of catalysts. It has already been proposed in U.S. Pat. No. 4,608,210 to use plastic binders, whose polymerization takes place photochemically or under X-rays. For UV or VIS irradiation, particularly polymers with nitro groups, which are in turn considered as high-energy binders are suitable.

SUMMARY OF THE INVENTION

The aim underlying the present invention essentially resides in providing a process wherein plastic binders polymerized under UV/VIS or X-radiation can be processed in the extruder.

According to the present invention the polymerization within the extruder is initiated by UV/VIS or X-radiation sources arranged around it and the radiation intensity and/or the wavelength of the radiation are controlled as a function of the pressure difference $\Delta p$ (pressure build-up) present over a clearly defined path in the terminal compression zone of the extruder, in such a way that the propellant or explosive strand or strands leave the extruder in dimensionally stable and cuttable manner.

It is expressly pointed out that the term UV/VIS ray also covers lasers.

The intensity of the radiation sources can be easily adjusted by switching on or off individual sources, interposing absorbers or the like and adjusting the wavelength by interposing filters. This makes it possible to very accurately adjust the viscosity or shear stress of the viscous mixture. By recording the pressure difference in the compression zone of the extruder upstream of the exit dies, it is possible to obtain a measure of the viscosity or shear stress there, which can be used as a control quantity for regulating the intensity and/wavelength. The intensity and/or wavelength are set in such a way that in the vicinity of the exit dies there is a degree of polymerization leading to a dimensionally stable and cuttable strand at the extruder outlet. Optionally the course of the shear stress for a particular binder type or for a particular mixture of binder and crystalline components can be recorded in model tests and stored as a desired value. The intensity and/or wavelength is then regulated up to the desired value via the measured actual values for the pressure difference $\Delta p$.

In the process according to the invention, polymerization in the extruder is solely initiated in order to obtain a dimensionally stable and cuttable strand. It can then be completed outside the extruder, optionally accompanied by further irradiation. The initiation of polymerization preferably takes place in a pressureless zone of the extruder.

Further influencing parameters for extrusion are the speed of the extruder shaft, the through flow and the residence time and these can be determined as control quantities by recording to the torque of the extruder drive.

For performing the present process, the invention is based on an apparatus with an extruder which, according to U.S. Pat. No. 4,608,210 comprises a casing with at least one feed opening, optionally a solvent supply opening and a casing section which is transparent to UV/VIS or X-rays and at least one extruder shaft with kneading and conveying segments, as well as with a storage container associated with the feed opening having a dosing means for the plastic binder and a storage container with dosing means for the components of the propellant powder or explosive materials in crystalline form and which is either associated with the feed opening or a supply opening located downstream thereof. Such an apparatus is characterized according to the invention in that in a vicinity of the radiation-transparent casing section are provided UV/VIS or X-radiation sources, a device is provided for regulating the intensity and/or wavelength and in the terminal casing section with the compression zone are provided successively in the conveying direction at least two pressure probes, whose pressure difference is used to regulate the intensity and/or the wavelength of the radiation.

For photochemically polymerising plastic binders, the radiation-transparent casing section is made from pressure-stable glass, which can in particular be quartz glass or amorphous, high-strength glasses.

The UV/VIS radiation sources can either be positioned outside the transparent casing section or embedded in the glass or quartz glass casing section and optionally provided with a cooling system.

In a preferred construction, in the case of photochemical polymerization a pressureless zone is formed on the extruder in the vicinity of the radiation-transparent casing section and this is readily possible through a corresponding configuration of the screw geometry or by correspondingly controlled segments. This avoids overloading of the transparent extruder section.

It is also advantageous in this case in the vicinity of the glass casing section to construct the screw segments wholly or partly from plastic, in order to avoid wear to the inside of the extruder, which could be detrimental to the transparency.

According to an embodiment, for polymerization under X-rays, it can be provided that at least two X-radiation sources are arranged on opposite sides of the radiation-transparent casing section and are surrounded by a shield.

The process according to the invention can be used on both single-shaft and twin-shaft extruders and they can rotate either in the same or in opposite directions. Practical tests have revealed that e.g. in the case of a twin-shaft extruder, whose two screw shafts each have a diameter of 58 mm, as a function of the binder type, it is possible to achieve a through flow of 25 to 70 kg/h.

BRIEF DESCRIPTION OF THE DRAWINGS

The invention is described in greater detail hereinafter relative to non-limitative embodiments and the attached drawings, wherein:

FIG. 2 is a schematic partical cross-sectional view through the extruder radiation-transparent casing section;

FIG. 3 is a cross-sectional view corresponding to FIG. 2 of another embodiment of a radiation-transparent casing section;

DETAILED DESCRIPTION OF THE PREFERRED EMBODIMENTS

Figure 1:
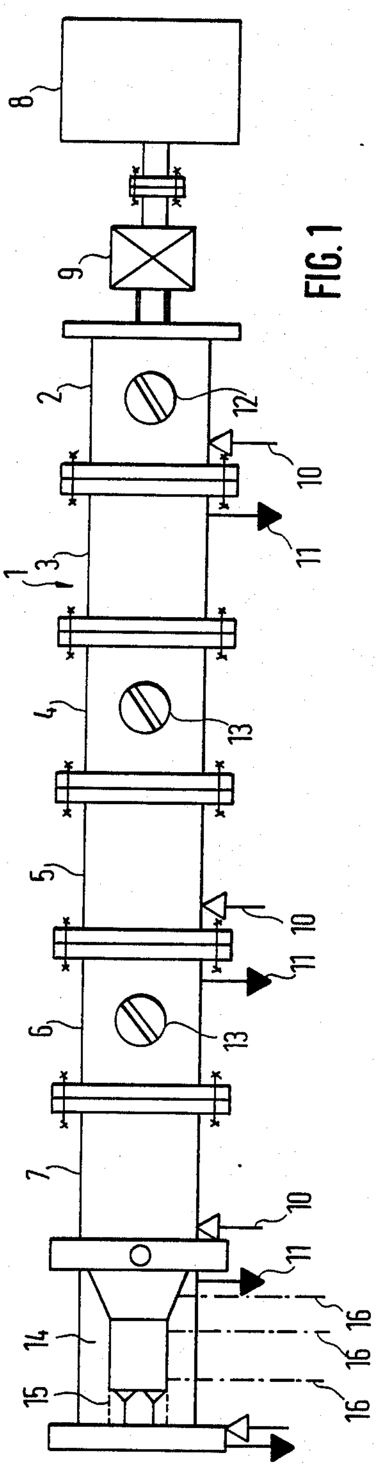
FIG. 1 is a schematic longitudinal view of an extruder constructed in accordance with the present invention.

Referring now to the drawings wherein like reference numerals are used throughout the various views to designate like parts and, more particularly, to FIG. 1 according to this Figure, the extruder has a casing generally designated by the reference numeral 1 formed from several modular casing sections 2 to 7. In the present case it is a twin-screw extruder, which is driven by a motor 8 or a hydraulic drive by a gear 9. Certain of the casing sections, namely sections 2, 3, 5, 6 and 7 in the illustrated embodiment, can be subjected to a through flow by a heat carrier in the direction of the arrows 10, 11, in order to bring the extruder to a higher temperature or, if necessary, to cool the same.

The first casing section 2 has a feed opening 12 for the dosing of the solid components (solid binder, crystalline explosive material or crystalline components of the propellant powder). Downstream thereof, there can be one or more openings (not shown) for injecting solvent. Furthermore, in the vicinity of casing sections 4 and 6, there are degassing openings 13, which can optionally be closed.

At its end, the extruder is provided with a compression zone 14 and connected thereto a female die 15, which ensures the desired shaping, e.g. in the case of propellant powders one or more strands with channels.

In the vicinity of compression zone 14 there are at least two and in the illustrated embodiment three pressure probes 16, by which it is possible to obtain a value for the pressure difference (pressure build-up) prevailing there, which serves as a measure for the viscosity and, consequently, for the degree of polymerization directly upstream of the strand exit.

Figure 4:
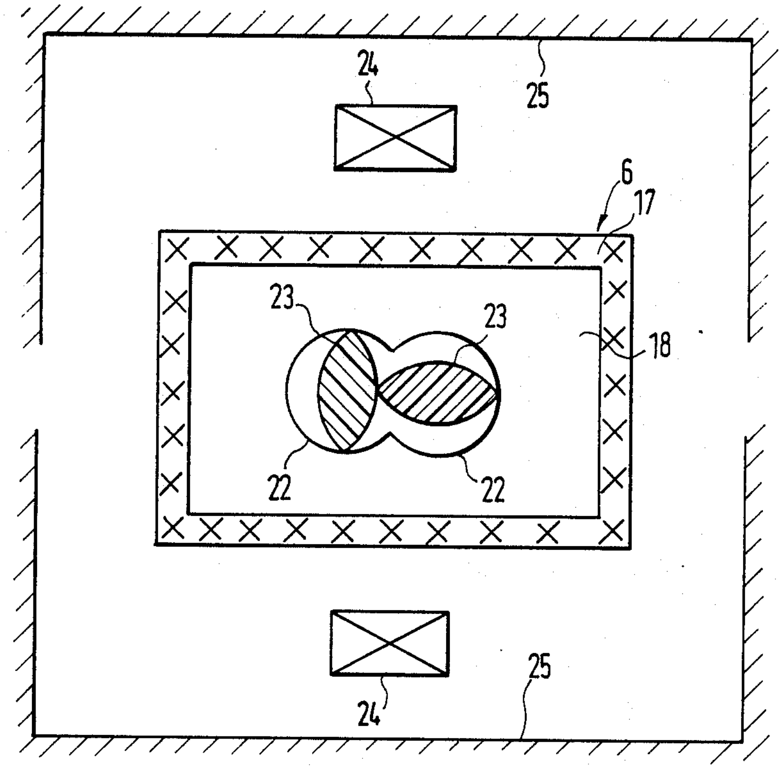
FIG. 4 is partically schematic cross-sectional view corresponding to FIGS. 2 and 3 through a further embodiment of a radiation-transparent casing section of an extruder.

One of the casing sections, for example, section 6, which preferably forms a pressureless zone is transparent to UV/VIS-rays or X-rays, as a function of the binder type. FIGS. 2 to 4 show embodiments of this casing section 6 with a flange 7 for screwing to adjacent casing sections. In the embodiment according to FIG. 2, casing 18 is made from glass, preferably quartz glass or an amorphous, high-strength glass. The UV/VIS radiation sources are constituted by a number of lamps 19, which are preferably symmetrically arranged around casing section 6. In place of simple lamps, it is also possible to use those with a cooling system, as indicated at 20.

In order to irradiate with maximum intensity, it is also possible, as shown in FIG. 3, to directly embed the UV or VIS radiation sources 20 in the quartz glass or amorphous glass casing 18. The radiation source 21 can also be surrounded by an embedded cooling system. The extruder zones 22, which pass into one another like a figure eight, are shaped into the glass casing 18. The two shafts with the screw or kneading segments 23 revolve in extruder zones 22. Segments 23 can optionally be made from plastic in the vicinity of casing section 6. FIG. 4 shows an embodiment of binder types, which polymerize under X-rays. The actual casing 18 is made from an adequately stable material, which is transparent to X-rays. Outside casing section 6 are provided on two facing sides, X-radiation sources 24, which are, in turn, surrounded by a shield 25. The latter may also surround the complete casing section 6.

What is claimed is:

1. A process for producing plastic-bound propellant powders and explosives by an extruder comprising a casing with at least one draw or feed opening, optionally a solvent supply opening and at least one extruder shaft with kneading and conveying segments, the casing having at least one section transparent to UV/VIS or X-rays provided by a radiation source means, the process comprising the steps of supplying a plastic binder polymerizable under the UV/VIS or X-rays through the feed opening until segments of the at least one extruder shaft "float" without wall friction in the plastic binder, subsequently adding the components of the propellant powder or explosive material in crystalline form, initiating the polymerization within the extruder by the radiation source means arranged around the casing, controlling at least one of the radiation intensity and wavelength of the radiation source means as a function of a pressure difference present over a clearly defined path in a terminal compression zone of the extruder, in such a manner that the propellant or explosive strand or strands exit the extruder in a dimensionally stable and cuttable manner.

2. A process according to claim 1, wherein the step of initiating the polymerization is effected in a pressureless zone of the extruder.

3. A process according to claim 1, wherein the pressure difference in a terminal compression zone of the extruder is used as a control quantity for regulating at least one of the intensity and wavelength of the radiation source means and a torque recorded in a drive of the extruder is also used as a control quantity.

4. An apparatus for producing plastic-bound propellant powders and explosives, the apparatus comprising: an extruder, a casing with at least one feed opening, optionally a solvent supply opening and a casing section transparent to UV/VIS or X-rays and at least one extruder shaft with kneading and conveying segments, a storage container associated with the feed opening having a dosing device for the plastic binder and a storage container with dosing device for the components of the propellant powder or explosive materials in crystalline form, which is associated with one of the feed opening or a supply opening downstream thereof, UV/VIS or X-ray radiation source means are disposed in a vicinity of the radiation-transparent casing section, means for regulating at least one of the intensity and wavelength, and at least two pressure probes are provided at the terminal casing section with the compression zone, said at least two pressure probes being successively positioned in a conveying direction and having a pressure difference used for regulating at least one of the intensity and wavelength of the radiation.

5. An apparatus according to claim 4, wherein, for photochemically polymerizable plastic binders, the radiation-transparent casing section is formed from pressure-stable glass.

6. An apparatus according to claim 5, wherein the casing section is made from at least one of quartz glass or amorphous, high-strength glass.

7. An apparatus according to one of claims 4 or 5, wherein the UV/VIS radiation sources are embedded in the glass casing section and are optionally provided with a cooling system.

8. An apparatus according to claim 4, wherein a pressureless zone is formed on the extruder in a vicinity of the radiation-transparent casing section.

9. An apparatus according to claim 4, wherein screw segments of the extruder are wholly or partly made from plastic in the vicinity of the radiation transparent casing section.

10. An apparatus according to claim 4, wherein at least two X-radiation source means are provided on opposite sides of the radiation-transparent casing section and are surrounded by a shield.

* * * * *